UNITED STATES PATENT OFFICE.

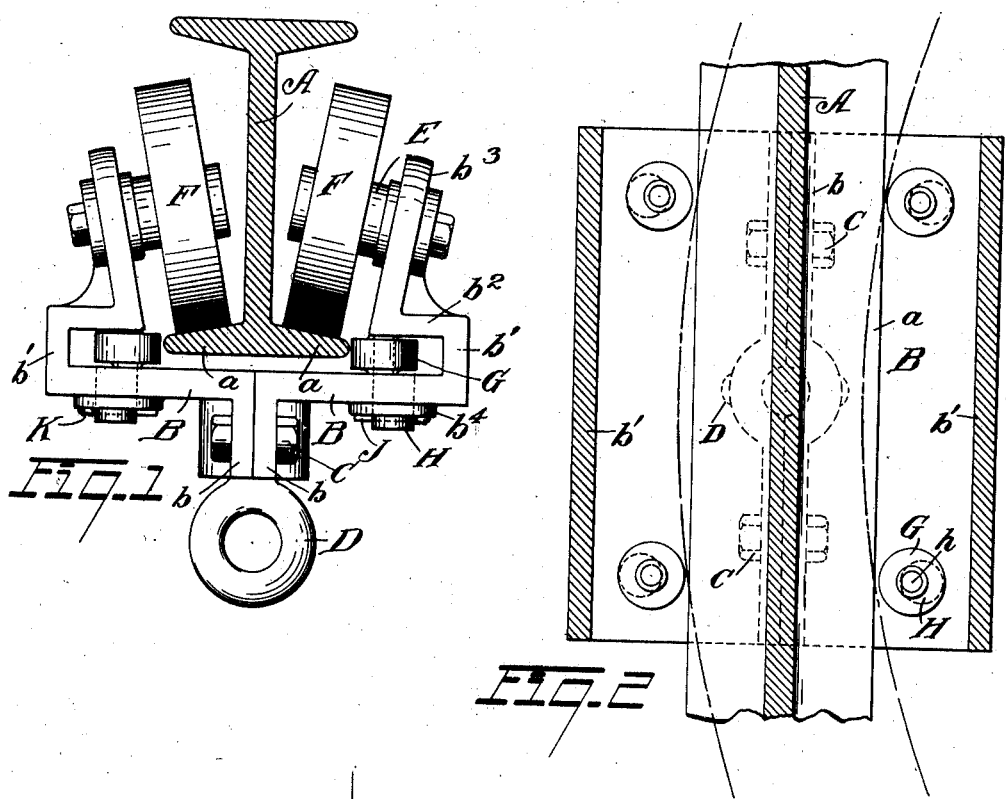
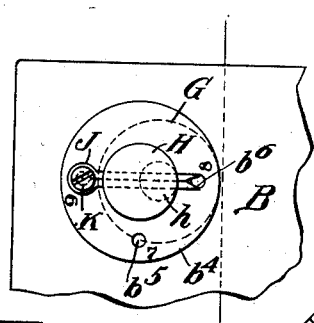
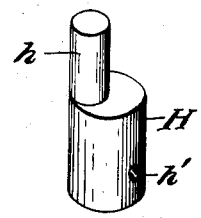
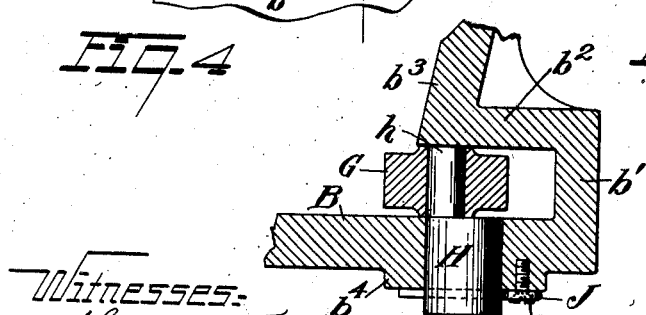

EDWARD Y. MOORE, OF CLEVELAND, OHIO.

TROLLEY.

No. 927,994.     Specification of Letters Patent.     Patented July 13, 1909.

Application filed March 19, 1909. Serial No. 484,550.

*To all whom it may concern:*

Be it known that I, EDWARD Y. MOORE, a citizen of the United States, residing at Cleveland, in the county of Cuyahoga and State of Ohio, have invented a certain new and useful Improvement in Trolleys, of which the following is a full, clear, and exact description, reference being had to the accompanying drawings.

My prior patent No. 874,367, issued Dec. 17, 1907, shows a trolley adapted to be mounted on the lower flange of an I-beam and having flangeless supporting wheels and lateral guide wheels whereby the trolley may easily operate on a curved track way.

The present invention is an improvement on the trolley shown and claimed in the patent referred to, and comprises a very simple and efficient adjustment by which the same trolley may operate on trackways of different widths. There are certain standard sizes of I-beams, the lower flanges of which have different widths, and I provide the trolley in the present invention not only with adjusting means, but with means for locking the guide wheels in several positions which are selected according to such standard width of flanges.

The invention is hereinafter more fully explained and is summarized in the claims.

In the drawings, Figure 1 is an end view of a trolley embodying my invention, the same being shown in place on a supporting track way, which is of I-beam construction; Fig. 2 is a horizontal section through the web of the beam and the trolley frame just above the guide wheels; Fig. 3 is an enlarged vertical section through one of the guide wheels and the adjacent portion of the frame; Fig. 4 is a bottom view of such portion of the frame, showing the means for holding and locking the guide wheel support; Fig. 5 is a perspective view of such support.

Referring to the drawing by reference characters, A represents a suitable trackway which is shown as a standard I-beam having the usually lateral projecting lower flange $a$.

B represents the frame of the trolley, which is shown as standing beneath the I-beam flange and extending upwardly on the two sides thereof, being made in two parts which are provided with downwardly extending flanges $b$ which are bolted together by the bolts C. This trolley frame may carry any supporting mechanism desired. The supporting mechanism shown comprises an eye D swiveled in the frame, which is to be taken as illustrative of any support carried by or formed on the trolley, whether a single support or a hoisting support or other mechanism, as desired.

The frame shown has at its outer edges upwardly extending webs $b'$, from the upper end of which webs $b^2$ extend inwardly, and from the inner ends of the latter webs project flanges $b^3$ which extend upward, as shown, and preferably incline outwardly. These flanges $b^3$ carry suitable studs E on which are journaled the supporting wheels F. These wheels are flangeless and rest on the upper surface of the I-beam flange, as shown.

The construction described in the last two paragraphs is shown and claimed in my prior patent referred to. In that patent the trolley is guided by lateral wheels which are carried on journals rigidly mounted in the frame. In the present invention I provide the lateral guide wheels, but I journal them adjustably. These guide wheels are designated G. They are located between the upper surface of the main portion of the frame B and the under surface of the inwardly projecting webs $b^2$ and are mounted on journal pins $h$. These pins consist of reduced eccentrically placed extensions of cylindrical blocks or pins H, which are mounted in the main frame B. In this construction it will be apparent that if the cylinder H is turned on its axis the wheel G is caused to approach or recede from the flange $a$.

To provide simple means for holding the pin H in the desired position, I preferably extend it below the frame B (which may be formed with a boss $b^4$ at this point), and I provide it with a laterally extending eye J which is adapted to stand just below the frame and which may receive a screw K passing through the eye into the frame. This eye may be very conveniently constructed and mounted by making it in the form of a split pin occupying a hole $h'$ in the pin H. I provide a number of screw threaded openings in the boss $b^4$, any of which are adapted to be occupied by the screw K, two of these openings, designated $b^5$ and $b^6$, as shown in Fig. 4, in addition to the opening occupied by the screw K.

It will be seen from the above description that I have provided an extremely simple method for adjusting the position of the wheels G and for holding them in any of a number of positions. The removal of the screw K allows the pin H to be turned on its axis as desired, or removed entirely for removing the wheels G. The curved broken lines in Fig. 2 illustrate a curved trackway on which my trolley is adapted to run equally well with a straight trackway, due to the omission of the flanges on the supporting wheels and the employment of the lateral guide wheels, while the adjustment provided adapts it to various trackways.

I have shown the adjustment adapted for three positions which may very conveniently correspond to I-beams having six inch, seven inch or eight inch flanges, respectively, which are standard sizes. These dimensions, however, are only given as illustrative, and I do not intend to limit myself thereto. In fact not only may changes of proportion be made without departing from my invention, but various mechanical equivalents may be employed if desired, and I do not intend to limit myself in the following claims further than the state of the art requires.

Having thus described my invention, what I claim is:

1. In a trolley, the combination with supporting wheels, lateral guide wheels, and means for adjusting said lateral guide wheels and locking their journals in fixed position.

2. A trolley adapted to run on the flange of a depending trackway and having in combination flangeless supporting wheels, lateral guide wheels, and means for adjusting said lateral guide wheels.

3. In a trolley adapted to ride on the flange of a depending support, the combination of a frame adapted to extend beneath such support and project upwardly onto opposite sides thereof, flange wheels carried by such upward projections and tracking on the flange of the support, and guide wheels mounted on vertical axes on opposite sides of such support, and means for moving said axes.

4. In a trolley, the combination with a frame, supporting wheels, guide wheels, adjustable journals for the guide wheels, and means for holding said journals in various fixed positions.

5. In a trolley, the combination of a frame, supporting members, guide wheels, and eccentric adjustments for the journals of the guide wheels.

6. In a trolley, the combination of a frame, supporting wheels, guide wheels, eccentric pins carrying the guide wheels and mounted in the frame, and means for locking said pins in different positions.

7. In a trolley, the combination of a frame, a guide wheel, an eccentric pin journaling the guide wheel and mounted in the frame, and an eye projecting from the pin and formed to receive a screw passing into the frame.

8. In a trolley, the combination of a frame, a supporting wheel, a guide wheel, an eccentric pin mounted in the frame carrying the journal of the guide wheel and having a hole in it, a pin formed with an eye occupying said hole and standing adjacent to the frame, and a screw adapted to pass through said eye into the frame.

9. In a trolley, the combination of supporting wheels, guide wheels, adjustable journals for the guide wheels, and means for holding said journals in one of a plurality of positions selected according to standard sizes of the supporting trackway.

In testimony whereof, I hereunto affix my signature in the presence of two witnesses.

EDWARD Y. MOORE.

Witnesses:
ALBERT H. BATES,
CURT B. MUELLER.